UNITED STATES PATENT OFFICE.

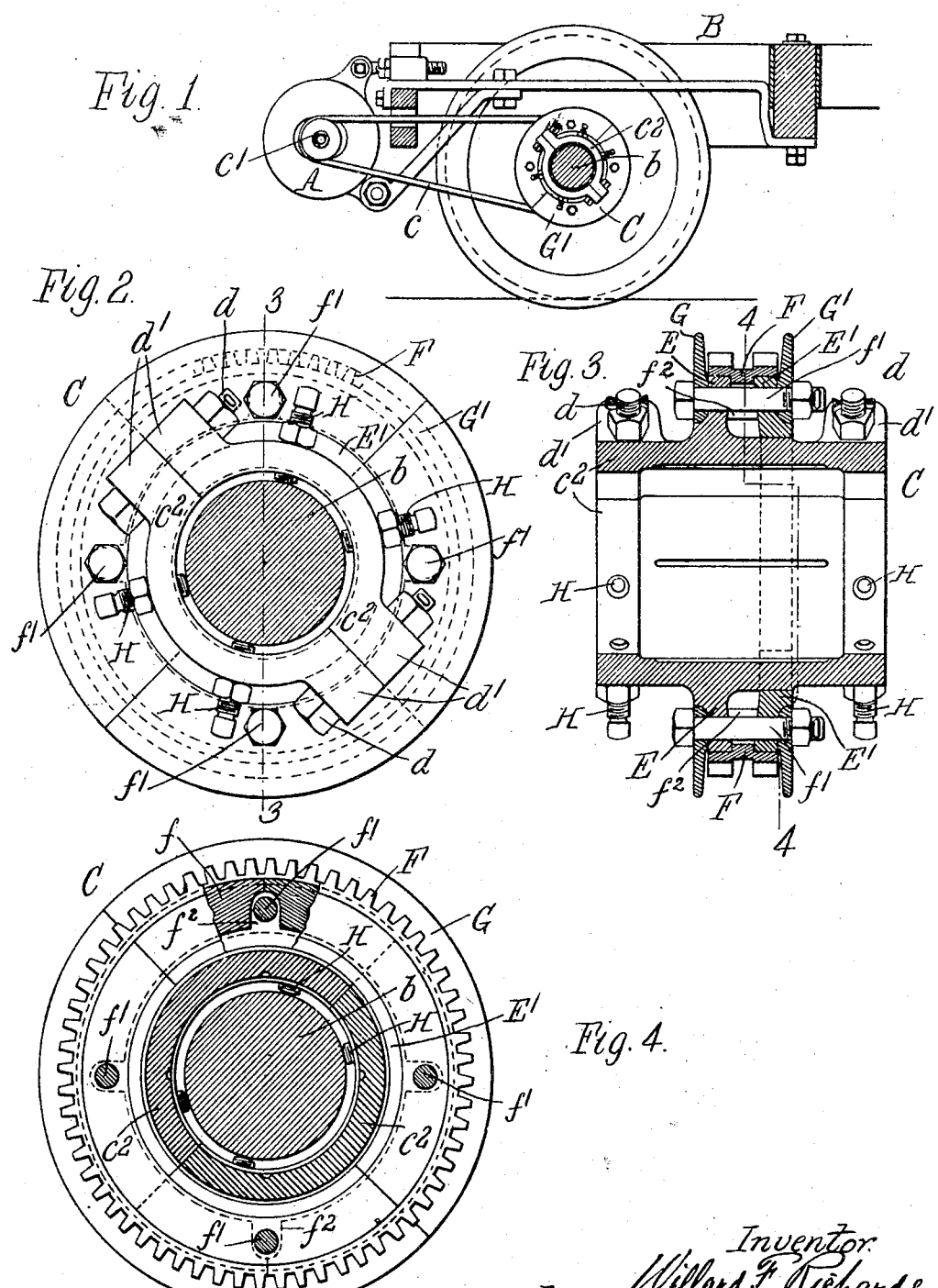

WILLARD F. RICHARDS, OF LANCASTER, NEW YORK, ASSIGNOR TO GOULD COUPLER COMPANY, OF NEW YORK, N. Y.

SPLIT GEAR-WHEEL.

946,735.  Specification of Letters Patent.  Patented Jan. 18, 1910.

Application filed May 2, 1908. Serial No. 430,485.

*To all whom it may concern:*

Be it known that I, WILLARD F. RICHARDS, a citizen of the United States, residing at Lancaster, in the county of Erie and State of New York, have invented a new and useful Improvement in Split Gear-Wheels and the Like, of which the following is a specification.

This invention relates to gear wheels and the like of the kind that are made in sections which are separable for attaching the wheels to and detaching them from their shafts.

In this application a sprocket wheel is described as embodying the invention which is especially intended for use on railway car trucks for driving a dynamo electric machine mounted on the truck, but the invention is applicable to gear wheels and other wheels for various different purposes.

The objects of the invention are to produce a strong and serviceable split sprocket wheel or the like of simple and inexpensive construction which can be readily secured on a shaft or axle and properly adjusted and alined with relation to another gear wheel or element with which it has an operative connection; also to provide a sprocket wheel or the like of strong construction, having a separate detachable toothed rim or outer peripheral part which can be readily removed and replaced when worn or broken without removing the wheel from its shaft or disconnecting the securing devices for the detachable rim; and also to construct and connect the component parts of the wheel so that the wheel as a whole will be strong and the parts cannot be easily broken or displaced.

In the accompanying drawings: Figure 1 is a fragmentary sectional elevation, on a reduced scale, of a car-truck equipped with a dynamo which is driven from the axle by a sprocket wheel embodying the invention. Fig. 2 is an elevation of the sprocket wheel and cross-section of the car axle. Fig. 3 is a longitudinal section of the sprocket wheel in line 3—3, Fig. 2. Fig. 4 is a transverse sectional elevation thereof, in line 4—4, Fig. 3.

Like letters of reference refer to like parts in the several figures.

In Fig. 1, A represents a dynamo mounted on a car truck B and driven from one of the axles $b$ thereof by a chain $c$ which passes around a driving sprocket wheel C on the axle and another sprocket wheel $c'$ on the shaft of the dynamo.

The sprocket wheel C, which embodies the invention, is constructed as follows: The hub or central part of the wheel consists of two separable halves or sections $c^2$ which are secured together about the axle or shaft $b$ by bolts $d$ passing through matching perforated lugs or ears $d'$ at the opposite ends of the hub sections. Between their ends the sections are provided with integral outwardly-extending parts which form a fixed circular web or flange E opposite to which is a coöperating clamping ring E' which consists of two halves or sections and surrounds the hub, on which it is movable toward and from the web E.

F represents a rim or outer peripheral part of the wheel which may be toothed, as shown, or have any suitable shape or character, depending upon the purpose for which the wheel is intended. This rim is made in two halves or sections. It surrounds and bears at opposite sides on the peripheries of the web E and the ring E', and it has an inwardly-extending securing rib $f$ which is gripped and held between the coöperating web E and clamping ring E' by bolts $f'$ passing through holes in the web and the clamping ring and open-sided slots $f^2$, Fig. 4, in the securing rib $f$. The securing rib is preferably of dove-tail cross-section, or undercut, and the inner faces of the web E and the clamping ring E' are shaped conformably thereto so as to interlock therewith and positively hold the rib in place between the web and the clamping ring. The sections of the web and the clamping ring break joints with the rim F and with each other, that is, the joints between the sections of each part are located between the ends of the sections of the adjacent part so that the parts, when bolted together, materially stiffen and brace each other against lateral deflection. The rim F can be readily detached when worn or broken to be replaced by a new rim by loosening the fastening bolts $f'$ and moving the clamping ring E' far enough to allow the dove-tail rib $f$ to be withdrawn from between the web E and the clamping ring. As the bolts $f'$ pass through the open-sided slots $f^2$ in the dove-tail rib, it is not necessary for the bolts to be removed to release the rim.

G G' represent guard flanges arranged at opposite sides of the toothed rim for preventing the chain from jumping off of the wheel. They are preferably made separate from the web and the clamping ring and are secured thereto by the fastening bolts f' for the rim and, like the other parts, are made in halves or sections which break joints with the web and the clamping ring, thereby further bracing and stiffening these clamping parts and the toothed rim. The guard flanges are preferably employed but could be dispensed with.

A sprocket wheel constructed as described is preferable to the ordinary two-part split wheel, because the parts, with the exception of the toothed rim, can be made of a cheaper grade of material, and if the rim becomes worn or broken it can be readily removed and replaced by a new one at a much smaller expense than the cost of a new wheel.

For the purpose of properly adjusting and alining the sprocket wheel C on the axle relative to the coöperating sprocket wheel, the axle hole of its hub or sleeve is preferably made of larger diameter than the axle, and adjusting or set screws H are provided at the opposite ends of the hub adapted to bear at their inner ends on the axle. When securing the wheel on the axle, pieces of paper or other thin material are placed between the abutting faces of the hub sections to hold the sections slightly apart. The wheel is then adjusted to proper position on the axle by means of the set screws H and Babbitt metal is run into the space between the axle and the hub. The paper is then removed and the halves of the hub drawn together so as to tightly clamp the Babbitt metal, and the set screws can also be tightened to supplement the clamping action of the hub sections on the Babbitt metal. When thus adjusted, the wheel will run perfectly true.

I claim as my invention:

1. In a wheel, the combination of a sectional hub provided with parts forming a circular web, a sectional clamping ring which surrounds said hub and is movable thereon toward and from said web, a sectional rim having portions arranged between and interlocking with said web and clamping ring, and fastening means which connect said web and clamping ring independently of the intervening portions of said rim for clamping said portions of said rim between said web and clamping ring, substantially as set forth.

2. In a wheel, the combination of a sectional hub provided with parts forming a circular web, a sectional clamping ring which surrounds said hub and is movable thereon toward and from said web, a sectional rim which surrounds said web and clamping rim and has a rib which extends between and interlocks with said web and clamping ring and is provided with transverse open-sided slots, and fastening devices connecting said web and clamping ring and passing through said slots for securing said rim to said hub, substantially as set forth.

3. In a wheel, the combination of a sectional hub provided with parts forming a circular web, a sectional clamping ring which surrounds said hub and is movable thereon toward and from said web, a sectional rim having portions arranged between said web and clamping ring, and fastening means connecting said web and clamping ring for clamping said portions of said rim between them, the sections of said web and clamping ring breaking joints with the sections of said rim and with each other, substantially as set forth.

4. In a wheel, the combination of a sectional hub provided with parts forming a circular web, a sectional clamping ring which surrounds said hub and is movable thereon toward and from said web, a sectional toothed rim having a securing rib which extends between said web and said clamping ring and is provided with transverse open-sided slots, sectional guard flanges at opposite sides of said toothed rim, and securing bolts passing through said guard flanges, web, clamping ring and the slots in said rib for securing said parts and said toothed rim together, substantially as set forth.

Witness my hand, this 29th day of April, 1908.

WILLARD F. RICHARDS.

Witnesses:
C. W. PARKER,
C. B. HORNBECK.